United States Patent [19]

Steenborg et al.

[11] Patent Number: 5,224,343
[45] Date of Patent: Jul. 6, 1993

[54] CONSTANT FUEL SUPPLY DEVICE FOR A THRUSTER

[75] Inventors: Manfred Steenborg, Ritterhude; Dietrich Ehrig, Grasberg, both of Fed. Rep. of Germany

[73] Assignee: ERNO Raumfahrttechnik GmbH, Bremen, Fed. Rep. of Germany

[21] Appl. No.: 983,259

[22] Filed: Nov. 30, 1992

Related U.S. Application Data

[63] Continuation of Ser. No. 659,867, Feb. 22, 1991, abandoned.

[30] Foreign Application Priority Data

Feb. 22, 1990 [DE] Fed. Rep. of Germany ....... 4005607

[51] Int. Cl.$^5$ .............................................. F02K 3/00
[52] U.S. Cl. ........................................ 60/240; 60/243; 60/39.462; 60/39.48
[58] Field of Search .............. 60/200.1, 39.281, 39.462, 60/39.48, 233, 243, 240

[56] References Cited

U.S. PATENT DOCUMENTS

| 2,683,963 | 7/1954 | Chandler | 60/39.48 |
| 2,919,543 | 1/1960 | Sherman et al. | 60/39.48 |
| 3,358,456 | 12/1967 | Lehrer | 60/39.462 |
| 3,479,818 | 11/1969 | Strobl | 60/39.48 |
| 3,525,217 | 8/1970 | De Mattia, Jr. et al. | 60/39.462 |
| 4,424,666 | 1/1984 | Woody | 60/39.281 |
| 4,777,794 | 10/1988 | Nielsen | 60/240 |
| 4,880,185 | 11/1989 | Apfel | 60/39.48 |

FOREIGN PATENT DOCUMENTS 3128735 2/1983 Fed. Rep. of Germany .

Primary Examiner—Richard A. Bertsch
Assistant Examiner—Howard R. Richman
Attorney, Agent, or Firm—W. G. Fasse

[57] ABSTRACT

In a fuel supply system for a space missile or a spacecraft in which the thrusters are supplied with liquid or gaseous fuel from a fuel tank in which the tank pressure decreases continuously during the operational life of the system, the fuel throughput and thus the thrust of the respective thruster or thrusters is maintained substantially constant by the arrangement of a constant flow device in the fuel line between the tank and the reaction chamber of the system. The constant flow device is a self regulating pressure loss device realized by increasing or decreasing the through-flow area of the device in response to changing fuel supply pressures.

6 Claims, 3 Drawing Sheets

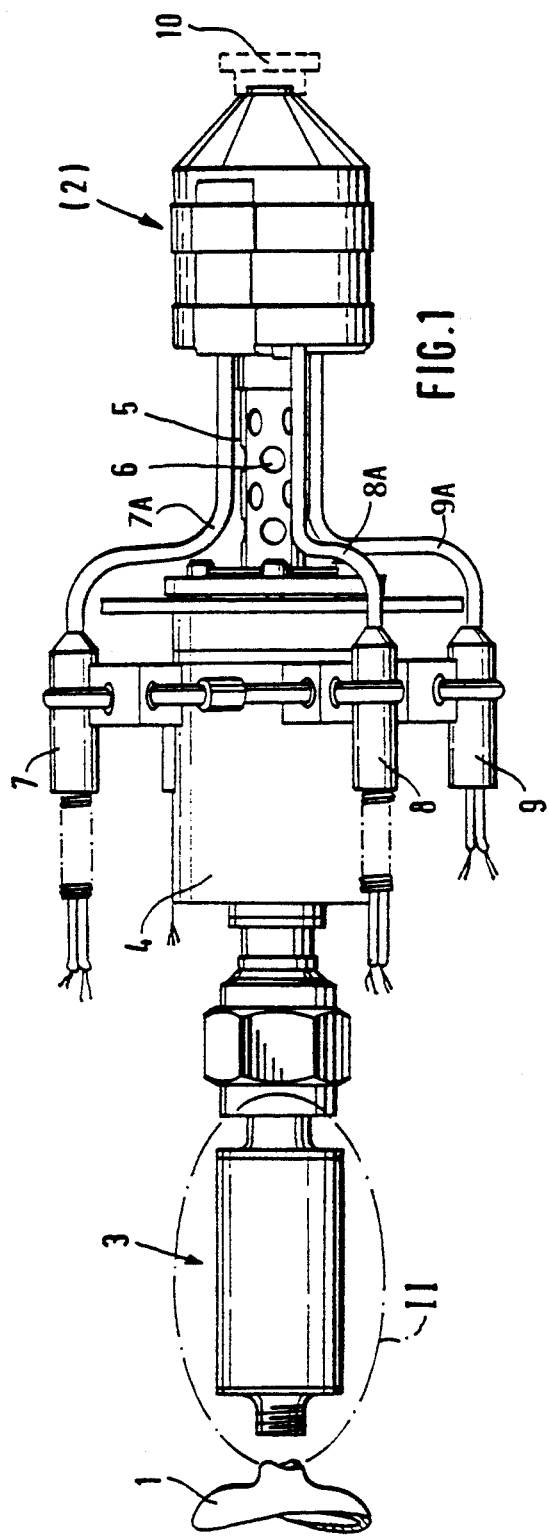
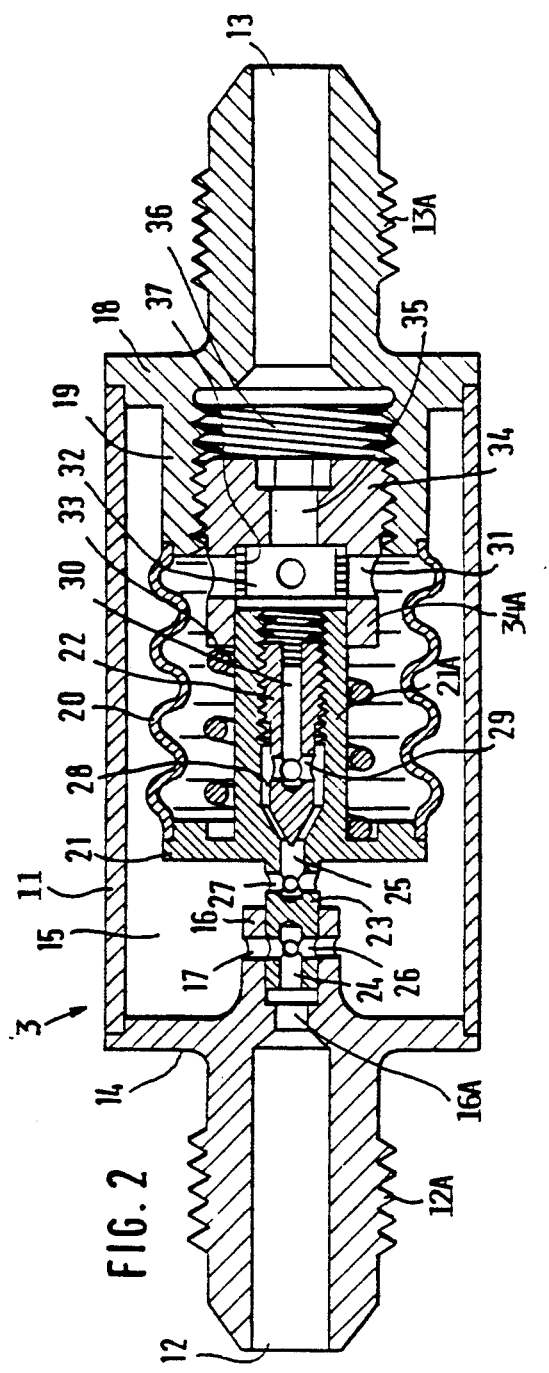

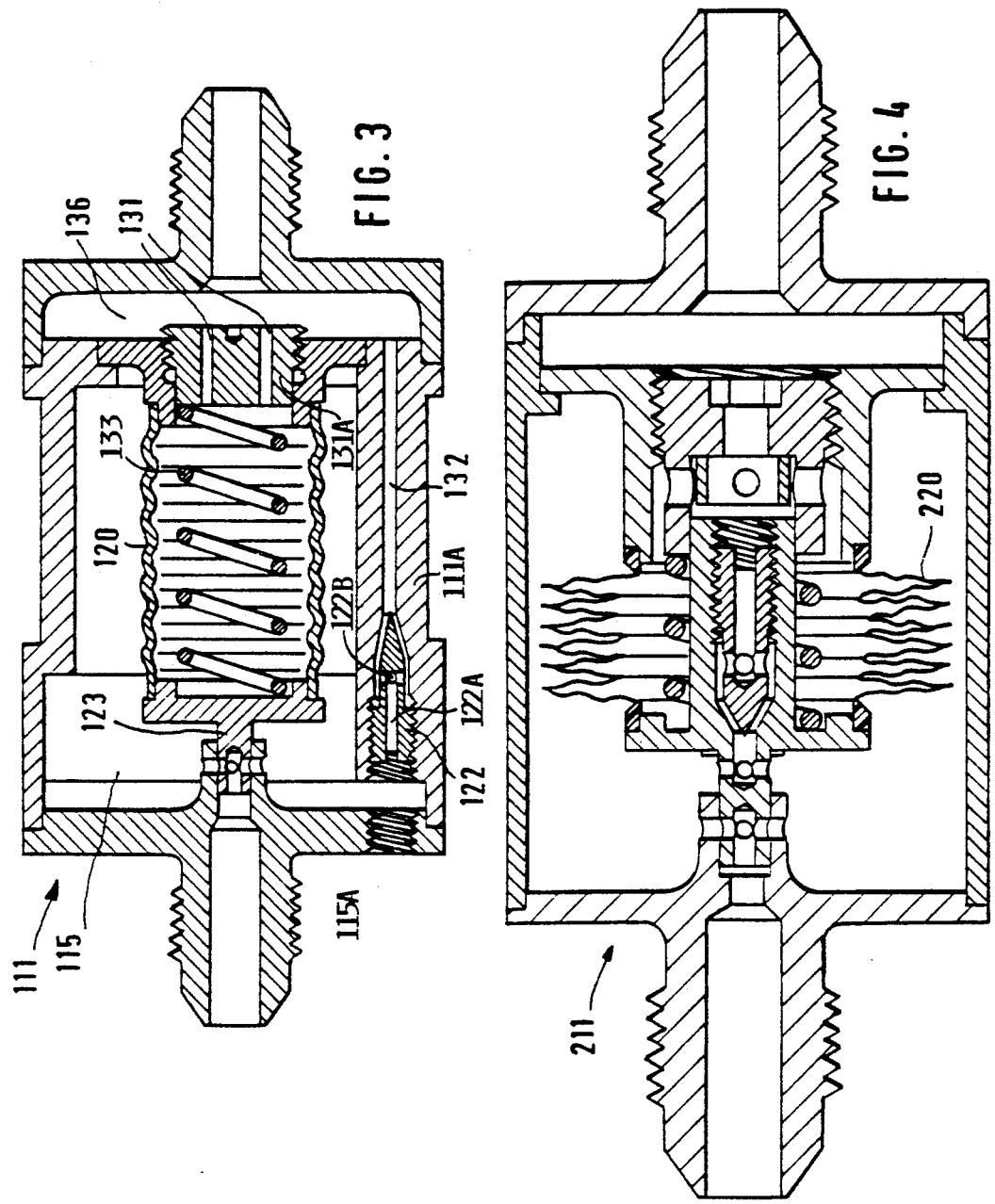

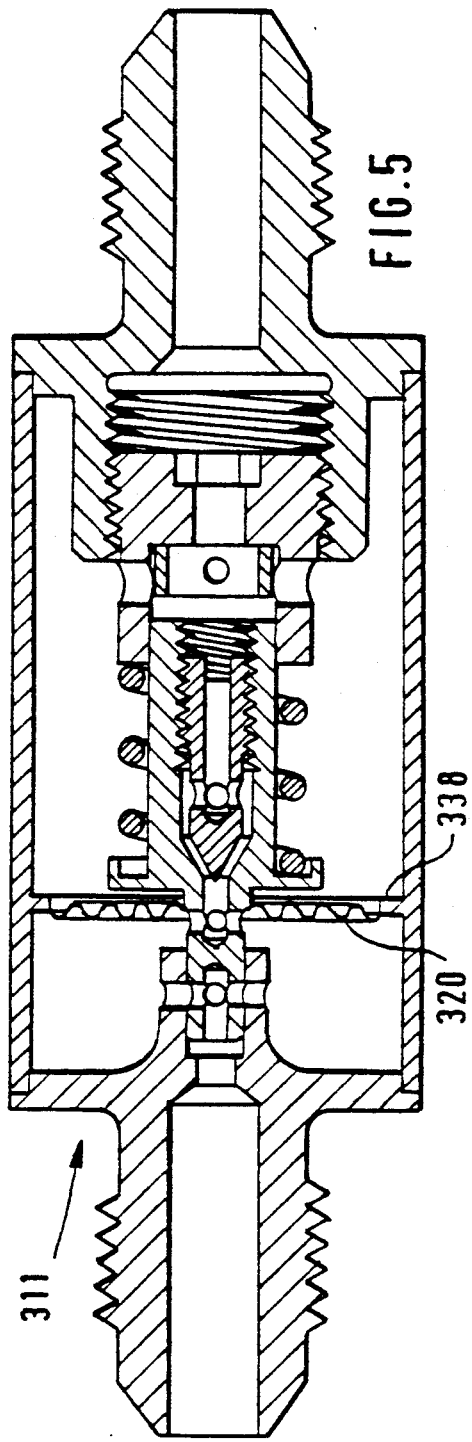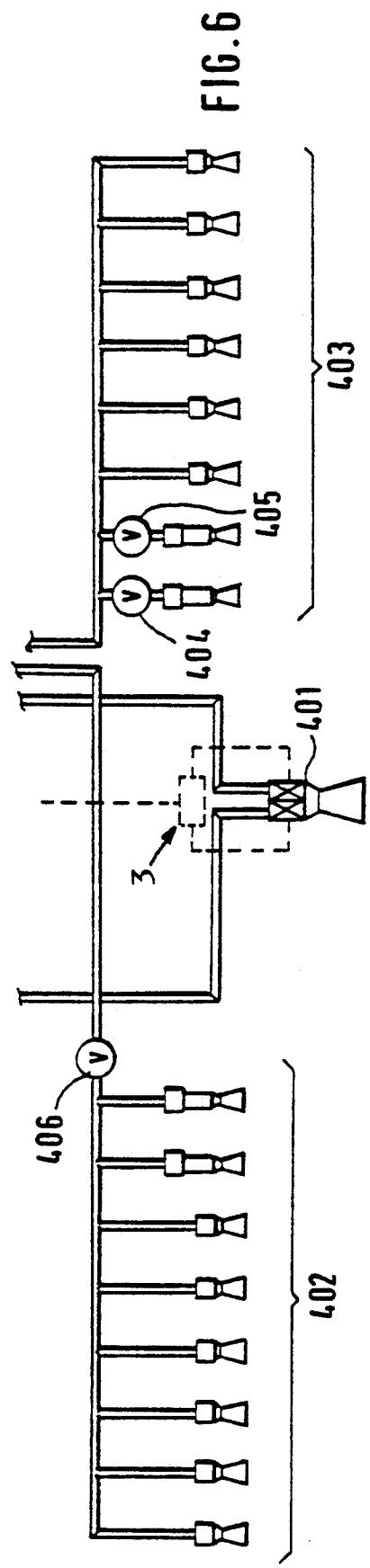

CONSTANT FUEL SUPPLY DEVICE FOR A THRUSTER

This application is a continuation of application Ser. No. 07/659,867, filed on Feb. 22, 1991, now abandoned.

FIELD OF THE INVENTION

The invention relates to a constant fuel flow for thrusters in spacecraft, e.g. a missile, whereby the constant fuel supply device is to be maintained for about an entire mission of thrusters in space missiles or spacecraft.

BACKGROUND INFORMATION

Fuel for the propulsion and position control thrusters of a spacecraft or missile is pressurized in at least one fuel tank which supplies the fuel under pressure into a reaction chamber. The fuel is either liquid or gaseous. Propulsion gases are produced in the reaction chamber, either by a chemical reaction of the fuel and/or by a decomposition. Due to the continuous removal of fuel from the fuel tank, the pressure in the fuel tank also continuously decreases.

The operation of spacecraft thrusters with a continuously decreasing pressure in the fuel tank is known as a blow-down operation. Such operations take place primarily as continuous operations. As a result, the thrust produced by the thruster becomes smaller and smaller as the operation continues and the fuel supply pressure decreases. The reason for this decrease is due to the fact that the fuel tank or in the case of a two component fuel, the fuel tanks, which are filled with the fuel or the fuel components, are charged with a compressed gas only once for pressurizing of the fuel or fuel components. As a result of the removal of the fuel from the fuel tank, the pressure sinks in the fuel tank and never returns to its initial value. As a result, the fuel mass flow per second or throughput through the thruster also decreases which in turn results in a reduction of the efficiency of the thruster. Incidentally, the term "throughput" as used herein means mass flow per second. Due to this pressure reduction, the in fact achievable optimal specific impulse value for such thrusters is achieved only for a relatively short time compared to the entire combustion or operational time of such thrusters.

The above described effect becomes especially disadvantageous in those cases in which a number of nominally identical thrusters are to be used, for example, for the position control of the missile or spacecraft.

German Patent Publication (DE-OS) 3,128,735 (Steenborg), published on Feb. 10, 1983 discloses a thruster which operates at increased temperatures due to the catalytical decomposition of a liquid energy carrier, whereby a closed loop control of the produced thrust is achieved in such a manner that the decomposition reaction and thus the quantity of fuel gas produced per unit of time, is controlled by a change of the temperature in the decomposition or reaction chamber. The temperature control is achieved by an electronic control circuit which controls the electrical current flowing through respective heating elements.

OBJECTS OF THE INVENTION

In view of the foregoing it is the aim of the invention to achieve the following objects singly or in combination:

to provide a constant fuel flow for the fuel supply to the thrusters of spacecraft or space missiles which are operated by liquid or gaseous fuels to make sure that the size of the thrusts produced over time remains substantially constant and within the range of the best specific impulse to which the particular thruster is capable during the entire blow-down range;

to maintain an optimal fuel throughput through the thrusters of a space missile or spacecraft thruster throughout the useful life thereof;

to compensate for the pressure drop in the fuel supply by a mechanical device having a constant flow characteristic; and to construct such a constant flow device suitable for performing the present method.

SUMMARY OF THE INVENTION

According to the invention the variable pressure difference between the fuel tank and the reaction chamber is used in a constant flow device which changes responds to this variable pressure difference between the fuel tank and the reaction chamber to maintain a constant mass flow of fuel to the reaction chamber. The method according to the invention provides the possibility to produce the thrusts generated by the different thrusters, as optimal thrusts of which the particular thruster is capable. Another advantage of the invention is seen in that in controlling a plurality of thrusters arranged in a branch of thrusters, a constant thrust can be achieved in a simple manner throughout the operational life of all the thrusters.

The apparatus according to the invention comprises a constant flow device arranged in the fuel supply conduit between a fuel tank and the reaction chamber. The constant flow device has such a characteristic that it increases its fuel through-flow cross-sectional area if the pressure difference across the constant flow device becomes smaller with decreasing tank pressures until the maximum fuel throughflow area has been reached at which time a blowdown operation begins.

The invention avoids the disadvantages mentioned above that are inherent in a conventional blow-down operation in which the pressure in the pressurized fuel tank, for example of a thruster operated by hydrazine, decreases from about 22 bar at the beginning of the mission to about 5.5 bar toward the end of the mission, thereby causing a decrease in the fuel through-flow quantity to about 25% of the initial through-flow quantity. The invention avoids such a through-flow decrease and instead obtains a fuel supply which maintains the optimal impulse value which is specific to the particular type of thruster involved. Such a constant fuel supply is maintained throughout the entire pressure range or at least throughout a substantial proportion thereof. The above mentioned characteristic of the constant flow device according to the invention enables the present device to compensate for the normally reducing mass flow by increasing the fuel through-flow cross-sectional area of the device as the pressure in the fuel tank decreases.

BRIEF DESCRIPTION OF THE DRAWINGS

In order that the invention may be clearly understood, it will now be described, by way of example, with reference to the accompanying drawings, wherein:

FIG. 1 shows a schematic side view of a thruster system with a constant flow device according to the invention arranged between a fuel tank and a reaction chamber of the thruster nozzle;

FIG. 2 is an axial sectional view through a first embodiment of a constant flow device according to the invention as shown within the dash-dotted line II in FIG. 1;

FIG. 3 is an axial sectional view through a second embodiment of a constant flow device according to the invention similar to that of FIG. 2;

FIG. 4 is an axial sectional view through a third embodiment of a constant flow device according to the invention similar to that shown in FIG. 3;

FIG. 5 is an axial view through a further embodiment of a constant flow device according to the invention; and FIG. 6 shows schematically a main thruster, a branch of thrusters controlled as a block, and another group of individually controlled thrusters.

DETAILED DESCRIPTION OF PREFERRED EXAMPLE EMBODIMENTS AND OF THE BEST MODE OF THE INVENTION

FIG. 1 shows a thruster system having a propellant tank 1 holding, for example hydrazine, and a reaction chamber 2 for producing the propulsion gases exiting through a thrust nozzle 10. The outlet of the fuel tank 1 is connected to the reaction chamber 2 through a closed loop type control device 3 in the form of a constant flow device according to the invention. The fuel in the example is a liquid monopropellant such as hydrazine, which is catalytically decomposed in the reaction or decomposition chamber 2 at elevated temperatures. The reaction chamber itself is enclosed in a conventional housing. Downstream of the constant flow control device 3, as viewed in a flow direction from the fuel tank 1 to the chamber 2, there is a flow control valve 4, the outlet of which is connected through a fuel injection pipe 6 to the chamber 2. The fuel injection pipe 6 is surrounded by a heat shield 5 which in turn is located between heating pipes 7A, 8A, and 9A heated by the heating elements 7, 8, and 9 for increasing the temperature in the reaction chamber 2. The exit nozzle 10 through which the produced propulsion gases are ejected, is only shown schematically by dashed lines at the exit end of the reaction chamber 2.

It should be noted that although the constant flow device 3 shown in FIG. 1 in conjunction with a propulsion system that is operated by a liquid monopropellant, it is to be understood that the present constant flow device can equally be used in systems operated by two-component fuels or in systems operated with gaseous fuels.

The axial section of FIG. 2 shows the constant flow device 3 on an enlarged scale compared to FIG. 1. The constant flow device 3 has a cylindrical housing 11 with an inlet pipe section 12 provided with a threading 12A for connection to an outlet of the fuel tank 1. The inlet pipe section 12 has a flange 14 which closes one end of the housing 11. The other end of the housing 11 is closed by a flange 18 forming part of an outlet pipe section 13 having a threading 13A for connection to an inlet of the flow control valve 4 shown in FIG. 1. The housing 11 encloses an inlet chamber 15. A pipe nipple 16 forms an extension of the flange 14 and reaches into the chamber 15. A bore 16A passes through the pipe nipple 16 to communicate with the bore through the pipe section 12. Additionally, the pipe nipple 16 has a cross-bore 17. The cross-bore 17 may be replaced by a slot on one or both sides of the pipe nipple 16.

The flange 18 which closes the right-hand end of the housing 11 forms an inward extension pipe section 19 reaching into the chamber formed by the housing 11. The pipe extension 19 is preferably cylindrical and carries an elastic, metal membrane bellows 20, the left-hand end is closed by an end plate 21 having an axially inwardly reaching extension 21A. A throttling screw 22 is adjustably mounted inside the extension 21A of the end plate 21. On the opposite side the end plate 21 carries a cylindrical projection 23 having an outer diameter that fits into the axial bore of the tubular pipe nipple 16 of the flange 14.

The cylindrical projection 23, as shown in FIG. 2, is constructed as a dosing needle. For this purpose the projection is provided with two axial bores 24 and 25 which are separated from each other by an intermediate wall section. The bore 24 communicates with the inlet bore in the pipe section 12. A cross-bore 26 communicates the bore 24 and thus the inlet through the further cross-bores 17 in the tubular pipe nipple 16 with the inlet chamber 15, if the cylindrical projection 23 is in the shown position. A further cross-bore 27 communicates the inlet chamber 15 with the axial bore 25 in the end plate 21. The bore 25 widens into a throttling pin valve seat for the left-hand conical end of the throttling screw 22 and then extends into a cylindrical space 28 around the throttling screw 22. The ring space 28 has such a shape with regard to the outer configuration of the throttling screw 22 that optimal flow conditions are provided.

The throttling screw 22 has an outer threading that engages an inner threading in the axial extension of the pipe section 21. Further, the screw 22 has at least one cross-bore 29 and an axial bore 30. Thus, the ring space 28 communicates through the bores 29 and 30 and through an outlet space 32, an axial bore 35 in an adjustment screw 34, and through an outlet space 36 with the axial bore of the outlet pipe section 13. A compression spring 33 is arranged inside the bellows 20. The left-hand end of the compression spring 33 bears against the end plate 21. The right-hand end of the compression spring 33 bears against the axially facing end surface of the adjustment screw 34 which has an axial bore in which the axial extension 21A of the end plate 21 is slideably received. An axial stop for the axially facing end surface of the extension 21A is provided in the form of a bushing 37 in the exit space 32 provided in the extension of the adjustment screw 34. The stop bushing 37 is provided with holes that communicate with the cross-bores 31 so as not to interrupt the path from the space inside the bellows 20 out into the axial bore of the pipe section 13. The compression spring 33 surrounds the axial extension 21A of the end plate 21.

The constant flow device shown in FIG. 2 operates as follows. Initially, the flow control valve 4 is closed and the bellows 20 assumes the position shown in FIG. 2. At this point it is assumed that the tank 1 is filled and the same pressure exists in the entrance chamber 15, in the exit space 36 and inside the bellows 20. After the flow control valve 4 has been opened, the pressure in the exit space 36 and also inside the bellows 20 drops, whereby the bellows, due to its elasticity, contracts. As a result of the contraction of the bellows 20 the dosing needle 23 is displaced relative to the pipe nipple 16, whereby the bores 17 and 26 no longer register with each other so that the flow cross-sectional area is reduced, whereby the flow is reduced and a pressure drop occurs. The contraction of the bellows 20 is limited by the stop bushing 37 when the axially facing end of the extension 21A contacts the bushing 37, whereby a flow interruption is avoided.

The characteristic pressure loss during operation is established between the bores 26 and 17 and this pressure loss depends on the adjusted throughput fuel quantity. A typical value of an adjusted throughput of fuel past the throttling screw 22 is 110 mg/s and the corresponding pressure loss is about 2 bar. A further pressure loss occurs in the fuel injection pipe of the valve. This pressure loss is also typically about 1.5 bar. Assuming an initial pressure difference between the fuel tank 1 and the reaction chamber 2 of, for example 20 bar, the bellows will contract until the through-flow cross-sectional area between the bore 26 and the cross-bore 17 at the pipe nipple 16 of the inlet end flange 14 adjusts itself to a value at which at this location a pressure drop of about 16.5 bar is established, (16.5=20-2-1.5 bar). Stated differently, the bellows 20 will release or permit the establishment of a flow cross-sectional area between the bores 17 and 26 which is very small. As the pressure decreases within the fuel tank 1 during continuing operation, the compression spring 33 will expand and it will thereby counteract the contraction of the bellows 20, whereby the cross-sectional flow area mentioned above gradually increases until the fully available cross-sectional flow area is established when only 3.5 bar pressure difference exists between the fuel tank 1 and the reaction chamber 2. This situation is, for example, the case when the reaction chamber pressure is about 2 bar and the pressure in the tank is about 5.5 bar.

The just described operation of the constant flow device according to the invention maintains a constant through-flow quantity for example, about 110 mg/s, over a pressure range between 22 and 5.5 bar inside the fuel tank 1. Below this lower limit of 5.5 bar, the constant through-flow quantity is no longer achievable so that the throughput or through-flow quanity will correspond to the blow-down operation below this minimum value of 5.5 bar in the fuel tank. In other words, below this minimum pressure value the mass flow will continuously decrease, according to the blow-down mode.

FIGS. 3, 4, and 5 illustrate further embodiments of the constant flow device according to the invention constructed according to a similar principle as described above, and the function of the further embodiments is the same as described above. Only the different components will be described.

Referring to FIG. 3, the throttling screw 122 is not arranged inside the bellows 120, but rather outside the bellows 120 in a lower portion 111A of the cylindrical housing 111. Fuel entering into the inlet chamber 115 through the dosing needle 123 as described above, passes through a groove 115A in the cylindrical housing chamber 111 into the axial bore 122A of the throttling screw 122. The axial bore 122A communicates through cross-bores 122B with an axial channel 132 passing into the exit space 136. An adjustable stop screw 131A has bores 131 which communicate the exit space 136 with the interior of the flexible elastic bellows 120. The position of the stop screw 131A is adjustable to adjust the bias of the spring 133. The operation is the same as described above.

Referring to FIG. 4 the construction is substantially the same as that of FIG. 2, however, the bellows 220 in FIG. 4 is a membrane bellows having a cross-sectional configuration as shown in FIG. 4 rather than the wavy cross-sectional configuration shown in FIGS. 2 and 3. This type of bellows is capable of responding rather rapidly to pressure changes in the entire system so that an even more exact maintaining of a preadjusted throughput is possible. Due to the different construction of the membrane bellows 220 the overall structure of the embodiment of FIG. 4 is more compact, since the housing 211 may be shorter than the housing 11 in FIG. 2. However, the membrane bellows 220 may require a larger diameter housing.

In the embodiment of FIG. 5, the cylindrical housing 311 of the control device has mounted therein a membrane disk 320 having a wavy cross-sectional configuration with an outer rim secured to an inwardly facing ring shoulder 338. The membrane disk 320 with its ridges and valleys arranged concentrically around the longitudinal central axis of the constant flow device has a sufficient elasticity to perform the same function as the bellows in the other embodiments. However, the embodiment of FIG. 5 has the advantage that the disk 320 is substantially lighter than a bellows and also a smaller mass so that a very sensitive control response characteristic is achieved in addition to a reduced weight compared to the other types of bellows.

FIG. 6 illustrates schematically a thruster arrangement for a space missile or spacecraft. A main propulsion thruster 401 has its own constant flow device 3. In the right-hand portion of FIG. 6, a group 403 of thrusters is equipped with one constant flow device 404, 405 according to the invention, for each thruster individually. On the other hand, the left-hand portion of FIG. 6 shows a group of thrusters 402 which are connected in common to a constant flow device 406 according to the invention. Thus, the through-flow fuel quantity or throughput for each thruster in group 403 is individually controlled while the fuel supply for all the thrusters of group 402 is controlled in common.

It should be mentioned that the description of the foregoing example embodiments relates to the control of a single component fuel supply. However, the present constant flow device is equally useful in controlling separate fuel components, for example, of a two component fuel system. In the latter case each fuel component would have its own constant mass flow device according to the invention to maintain a constant mass flow as described.

The present constant flow device may be installed in a propulsion system for minimizing overflow also known as the so-called "surging effect", whereby an adiabatic compression is avoided especially in propulsion systems operated with hydrazine as a fuel.

The present system is also suitable for supplying a constant fuel flow to power adapted catalytic thrusters including electrical resistors for heating the thruster exhaust gases.

The present system is also useful for a thruster in the form of an arc-jet engine including electrical arc means for heating engine exhaust gases.

Although the invention has been described with reference to specific example embodiments it will be appreciated that it is intended to cover all modifications and equivalents within the scope of the appended claims.

What we claim is:

1. An apparatus for providing a constant fuel supply to a reaction chamber of a thruster in a spacecraft or missile, said reaction chamber having a reaction pressure therein, comprising pressurized fuel tank means for supplying at least one fuel component to said thruster, wherein a tank pressure in said fuel tank means drops as the fuel supply continues, at least one fuel line connecting said fuel tank means to said thruster, and a constant flow device connected in said at least one fuel line, said constant flow device comprising elastic pressure responsive means exposed to said reaction pressure and to said tank pressure for initially establishing a minimal through-flow cross-sectional area when said tank pressure is high and for increasing said through-flow cross-sectional area in said constant flow device in response to a decrease in said fuel tank pressure, whereby upon reaching a maximum through-flow cross-sectional area a blow-down operation follows a constant fuel flow operation.

2. The apparatus of claim 1, wherein said elastic pressure responsive means comprise a position adjustable throttling screw (22, 122) operatively mounted in said constant flow device, elastic membrane means (20, 120, 220, 320) arranged in said constant flow device to be directly exposed to a pressure difference between said tank pressure and said reaction pressure, and a dosing needle (23, 123) operatively connected to said elastic membrane means for providing said constant fuel supply until said maximum through-flow cross-sectional area is estabilished.

3. The apparatus of claim 2, wherein said elastic membrane means comprise a bellows, said elastic pressure responsive means further comprising compression spring means for cooperation with said bellows, said compression spring means assisting in an expansion of said bellows, whereby said through-flow cross-sectional area will first decrease to establish said minimal through-flow cross-sectional area, said compression spring counteracting a contraction of said bellows, whereby said through-flow cross-sectional area will increase until said maximum through-flow cross-sectional area is established for performing said blow-down operation after said constant fuel flow operation.

4. The apparatus of claim 1, comprising at least two fuel lines, one for each fuel component of a two component fuel, and wherein one constant flow device is arranged in each fuel line.

5. The apparatus of claim 1, wherein said at least one fuel line is provided in common for a plurality of thrusters (402), and wherein said constant flow device (406) is arranged in said at least one fuel line provided in common for said plurality of thrusters.

6. The apparatus of claim 1, wherein said constant flow device comprises a stop bushing (37) positioned for preventing a flow interruption.

* * * * *